April 1, 1958 G. N. RULLO 2,828,638
PRECISION CONTROLLED POWER INTEGRATOR
Filed March 30, 1955
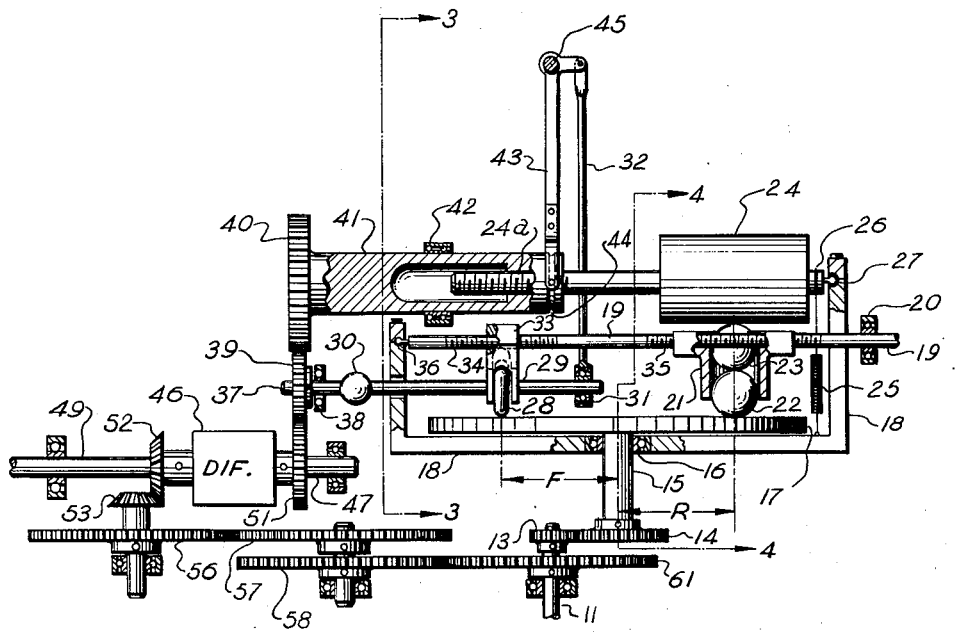
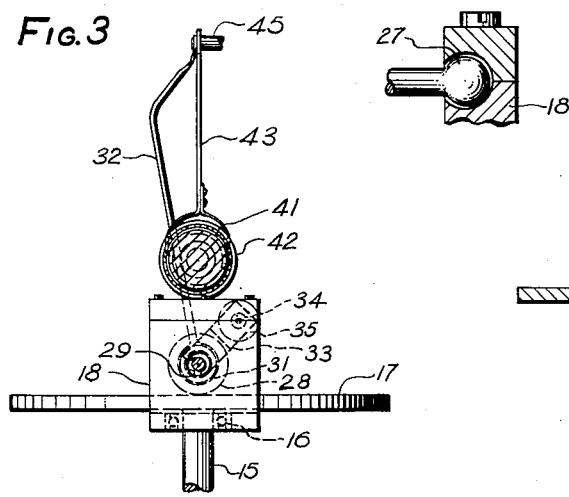
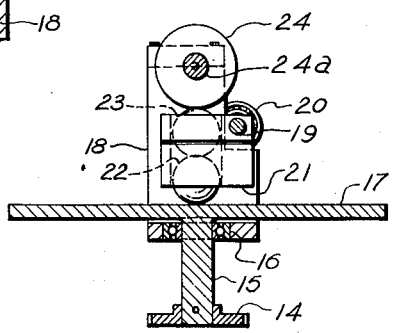
INVENTOR.
GABRIEL N. RULLO
BY
Charles P. Boberg

United States Patent Office 2,828,638
Patented Apr. 1, 1958

2,828,638

PRECISION CONTROLLED POWER INTEGRATOR

Gabriel N. Rullo, Astoria, N. Y., assignor to Control Instrument Company, Brooklyn, N. Y., a corporation of New York Application March 30, 1955, Serial No. 497,943

9 Claims. (Cl. 74—190)

This invention relates to integrating devices, and particularly to mechanical integrators for supplying high-torque outputs.

There is at the present time a great need for a mechanical integrator which will furnish an accurately adjusted high-torque output, especially under conditions where the load on the instrument is apt to vary. Prior integrating devices have been so constructed that a variable load usually would cause unwanted variable slippage of the frictionally coupled rotating parts, thereby impairing the accuracy of the instrument. On the other hand, if the frictional pressures were adjusted to prevent unwanted variable slippage, the control shaft of the instrument then might require an unreasonably high torque, which generally would not be feasible, and further more the output would not respond to input variations with the desired sensitivity or precision.

A principal object of this invention is to provide an improved mechanical integrator which is capable of furnishing self-controlled high-torque output whenever needed without imposing any appreciable load upon the low-torque, adjustable input means of the instrument, and without the sacrifice of precision due to output load variation.

Another object is to provide a mechanical integrator having one input thereto supplied by a source of power sufficient to handle heavy loads and having a variable input means requiring substantially no power which can be adjusted at low torque, said variable input means controlling a novel mechanism whereby the output of the integrator will at all times correspond accurately to the input despite the magnitude of the load or any fluctuations therein.

A further object is to provide an improved ball type integrator having means whereby the external load is coupled to a source of motive power by frictional coupling means distinct from the adjustable ball coupling of the instrument, with the contact pressure of this frictional coupling means being precisely regulated according to the relation between the motion of the load and the motion transmitted by the ball coupling to the integrating member of the instrument, the arrangement being such that variable slippage of the frictional coupling means is adjusted automatically to the desired extent without placing any undesirable load upon the ball coupling.

The objects of the invention will become apparent upon consideration of the following description and drawings which disclose, by way of example, the principle of the invention and the best mode, which has been contemplated, of applying that principle.

In the drawings:

Fig. 1 is a partially sectional side elevation of a precision-controlled mechanical integrator constructed in accordance with the principle of the invention.

Fig. 2 is a detail section of a ball-and-socket joint employed in this device.

Figs. 3 and 4 are sectional views taken on the lines 3—3 and 4—4, respectively, in Fig. 1.

The illustrated integrating device has two input shafts 11 and 19, Fig. 1, the respective movements of which may represent two factors of the integration problem. For example, the rotation of shaft 11 may represent the passage of time, while the angular or rotational position of shaft 19 represents speed. The output of the device, which is the resultant integration of these two inputs, will represent distance.

On shaft 11 is mounted a gear 13, which meshes with a gear 14 mounted on a shaft 15, the latter being journaled in a bearing 16 supported by the housing 18. A disc or turntable 17 is mounted on the other end of shaft 15 within the housing 18. The angular velocity of shaft 11 represents one input to the device, and in fact the shaft 11 may be regarded as furnishing the entire motive power for the apparatus. Therefore, the power delivered to the input shaft 11 must be sufficient to handle the heaviest load which will be placed upon the integrator.

The other input shaft 19 is journaled in a bearing bracket 20 suitably supported outside of the housing 18 and has a threaded portion 35 which extends into the housing 18. A carriage 21 containing the balls 22 and 23 has a threaded insert in which the threaded portion 35 of shaft 19 is received. The carriage 21 will travel longitudinally on the threaded portion 35 of shaft 19 when shaft 19 is rotated, and the ball 22 is maintained in contact with the disc 17 at a position determined by the angular position of shaft 19 at each instant. The distance R, Fig. 1, from the center line of shaft 15 to the point of contact of ball 22 and disc 17 is a measure of, or is proportionate to, the second input to the integrating device.

When disc 17 is caused to rotate, the ball 22 will generate on the surface of disc 17 a circle of radius R. Assuming that there is no slip between ball 22 and disc 17, the linear speed of ball 22 at its periphery will be a function of the angular velocity of disc 17 and the distance R. That is, the linear speed of ball 22 is equal to some constant multiplied by the product of the angular velocity of disc 17 and the distance R. The angular velocity of the disc 17 depends directly upon the angular velocity of the input shaft 11, and the radius R is determined by the instantaneous angular position of the input shaft 19.

The peripheral motion of ball 22 is transmitted by means of frictional forces to ball 23, from whence it is imparted to cylinder 24, which is made to bear upon ball 23 by means of spring 25 and ring 26. The cylinder 24 is connected at one end thereof to housing 18 by means of a ball-and-socket joint 27 (Fig. 2) which allows cylinder 24 to have rotational motion but constrains it axially. The rotation of cylinder 24 then represents the integrated resultant of the two inputs at shafts 11 and 19, respectively.

Thus, to give an example, the input to the shaft 19 may represent "speed" while the input to shaft 11 represents "time," and the result of the integration then is "distance." The radius R, i. e., the radial displacement of the ball 22 from the center of the shaft 15, measures the input to shaft 19. The input to shaft 11 is measured by the total angular displacement or rotation of the shaft 15, starting from a given instant. The total displacement or travel of any point on the periphery of cylinder 24 will represent the integrated sum of the instantaneous products, as is well known in the art.

In conventional integrators the output of the instrument is taken directly from an element corresponding to the cylinder 24. In accordance with the present invention, however, the motion of cylinder 24 merely controls or regulates the output of the integrator, so that the external load is not placed directly upon the cylinder 24.

Referring to Figs. 1 and 3, the wheel 28, which is mounted on a slotted shaft or axle 29, is in contact with disc 17 and is caused to rotate due to the frictional force applied to it by the disc 17 as the latter rotates. The angular velocity of wheel 28 is dependent upon the angular velocity of disc 17, the distance F from the center line of shaft 15 to the point of contact of wheel 28 and disc 17, and the pressure or force of the wheel 28 upon disc 17. Axle 29 has one of its ends mounted in a universal joint 30 and the other end journaled in a self-aligning bearing 31, which is secured to a linkage 32. The longitudinal position of wheel 28 on shaft 29 is determined by means of a positioning fork 33 which has a threaded insert for receiving a threaded portion 34 of the shaft 19, so that the position of wheel 28 is controlled by the rotation of shaft 19. One end of shaft 19 is connected to the housing 18 by means of a ball-and-socket joint 36 (similar to the joint 27, Fig. 2) which allows the shaft 19 to have rotational motion but constrains it axially. The pitch of threads 34 is opposite to that of threads 35 on shaft 19 in order that the rotation of the input shaft 19 will increase or decrease the distance F by the same amount that the distance R is increased or decreased as shaft 19 turns.

The rotational motion of wheel 28 and shaft 29 is transmitted by universal joint 30 to shaft 37, which is rotatable in bearing bracket 38 and has mounted on it the output gear 39. The output gear 39 is meshed with gear 40, which is mounted on a partially hollow shaft 41. Shaft 41 is mounted in sliding relation to its bearing 42 and has a portion of its hollow end internally threaded. A threaded extension 24a of cylinder 24 is inserted in the threaded hollow portion of shaft 41. Relative rotation of shaft 41 and cylinder 24 causes shaft 41 to move axially; however, the teeth of gear 40 are sufficiently broad to maintain this gear meshed with gear 39 despite its axial movement. The threading of extension 24a must be arranged so that when shaft 41 moves longitudinally it will move in the proper direction. Assuming that in Fig. 1 disc 17 rotates out of the plane of the paper, toward the viewer on the right, and into the plane of the paper, away from the viewer on the left, then extension 24a must have left-hand threads as shown in the figure. If disc 17 were assumed to rotate in the opposite direction, extension 24a would require right-hand threads.

Initially the distances R and F must be such that gear 40 is driven by gear 39 at a rotational speed slightly greater than that of cylinder 24, thereby producing a differential axial movement of shaft 41. As shaft 41 travels axially, it causes bell crank 43, one end of which has a yoke received in a groove 44 on shaft 41, to rotate on its fixed pivot 45 and thereby raise linkage 32, which in turn tends to lift the wheel 28 away from the disc 17. This relieves the contact pressure between wheel 28 and disc 17. As the contact pressure is relieved, the angular velocity of wheel 28 decreases due to the slip between wheel 28 and disc 17, causing the angular velocity of shaft 41 to decrease. Should the rotational speed of shaft 41 fall below the rotational speed of cylinder 24, however, the resultant axial movement of shaft 41 will be in the opposite direction, thereby causing an increase in pressure between wheel 28 and disc 17. This increased pressure causes the frictional coupling between wheel 28 and disc 17 to be increased, thereby effecting an increase in the angular velocity of shaft 41.

By this continuous action a balance is reached between slip and pressure so that the rotary motion of wheel 28 continuously follows the rotary motion of cylinder 24. The torque transmitted by the wheel 28 to the load, however, can be much greater than the torque transmitted by the balls 22 and 23 to cylinder 24. It will be noted that the shaft 41, bell crank 43 and connecting link 32 act as a force multiplying means to produce a high contact pressure between the wheel 28 and disc 17 in response to a very small force applied by the cylinder 24. Hence, a very slight loss in speed caused by the application of a heavy load to the integrator produces an instantaneous increase in the frictional coupling between wheel 28 and disc 17 sufficient to handle the increased load without causing slippage between the balls 22 and 23, disc 17 and cylinder 24. The rotation of cylinder 24 therefore is uninterrupted.

Such load increases can be of a momentary or sustained nature, and as soon as normal speed of wheel 28 has been restored, the pressure between the wheel 28 and disc 17 automatically is relieved. Hence, the input shaft 19 can be turned by a very light torque since the wheel 28 now has very little if any friction on the turntable 17, and of course the balls 22 and 23 are antifriction devices insofar as their radial movements are concerned.

Since the distance F in Fig. 1 never can be zero, provision is made whereby the motion of gear 39 at zero input is canceled. This is accomplished by employing a differential, designated generally as 46, which is interposed between shaft 47 and shaft 49, Fig. 1. Gear 39 drives one differential input gear 51, and the other differential input gear 52 is driven by a bevel gear 53 which is coupled through gears 56, 57, 58 and 61 to the input shaft 11. The shaft 49 delivers the effective output of the device, and the load is coupled to this shaft 49. With zero input, as represented by a predetermined minimum value of radius R, no output motion will be delivered by shaft 49 due to the action of differential 46, and the continuous following of cylinder 24 by wheel 28.

To summarize, the illustrated integrator is adapted to furnish a self-controlled high-torque output (shaft 49) in response to a variable load with approximately the same precision that would be realized by employing a conventional integrator to handle a non-varying low-torque load. Furthermore, one is able to adjust the input of the present integrator all the way from its maximum value to zero without adversely affecting the accuracy of the instrument.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. In an integrating device of the type having a rotatable driving member and a rotatable integrating member frictionally coupled thereto, the combination with said driving member and said integrating member of a second rotatable member in frictional contact with said driving member, an output member driven by said second rotatable member, a movable device supporting said second rotatable member, and a second device coupled to said movable device having a rotatable connection with said output member and a screw-threaded connection with said integrating member for adjusting the contact pressure between said second rotatable member and said driving member.

2. In a mechanical integrator of the type having a rotatable integrating member with driving means adapted to rotate the same and adjusting means to control the speed at which said integrating member is rotated, the combination therewith of a second rotatable member coupled to said driving means, said second rotatable member being coupled also to the external load of the integrator, means controlled by said adjusting means for determining the speed at which said second rotatable member will be rotated by said driving means, and motion-responsive means controlled jointly by said integrating member and said second rotatable member in accordance with their relative speeds for regulating the amount of coupling between said second rotatable member and said driving means without appreciably affecting the torque required to rotate said integrating member.

3. An integrating device comprising in combination a turntable adapted to be driven by a source of power, a first rotatable member frictionally engaged with said turntable to be rotated thereby, a second rotatable member frictionally engaged with said turntable to be rotated thereby, input means operable to adjust the positions of said first and second rotatable members relative to the center of said turntable for determining the respective speeds at which said rotatable members will be rotated, output means operably connected to said second rotatable member for transmitting power from the power source to a load through said turntable and said second rotatable member, means for sensing differential rotational motion between said first and second rotatable members, and means responsive to said sensing means for adjusting the amount of frictional coupling between said second rotatable member and said turntable to maintain a given relationship between the respective speeds of said rotatable members notwithstanding the magnitude of the load.

4. An integrating device comprising a turntable adapted to be driven by a source of power, a first rotatable member frictionally engaged with said turntable to be rotated thereby, a rotatable integrating member frictionally engaged with said first rotatable member to be rotated thereby, a second rotatable member, supporting means for holding said second rotatable member in frictional engagement with said turntable to be rotated thereby, said supporting means being movable to vary the amount of frictional coupling between said second rotatable member and said turntable, output means coupled to said second rotatable member for transmitting power therefrom to a load, and a differential motion-responsive mechanism coupled on one side thereof to said output means and on the other side thereof to said integrating member for adjusting the position of said supporting means in accordance with the relative motion between said integrating member and said second rotatable member.

5. An integrating device as specified in claim 4, wherein said differential motion-responsive mechanism includes a movable device which is positioned differentially in accordance with the sense and magnitude of said relative motion, and force multiplying means actuated by said movable device and effective to move said supporting means for varying the friction between said second rotatable member and said turntable.

6. An integrating device comprising a disc rotatable about a given axis, power supply means for rotating said disc about its axis, a wheel cooperating with the surface of said disc so that motion of said disc causes said wheel to rotate, an axle on which said wheel is mounted for transmitting to a load power which is delivered to said wheel by said disc, said wheel being axially movable on said axle, means for positioning said wheel selectively along said axle, supporting means for said axle enabling said axle to be moved toward and away from said disc for varying the frictional force between said wheel and said disc, ball means cooperating with the surface of said disc, a ball carriage retaining said ball means, a cylindrical member engaged with said ball means so that rotational movement is imparted to said cylindrical member by said disc through the medium of said ball means, means restraining said cylindrical member against axial movement, an input shaft having screw-threaded connections with said ball carriage and said wheel positioning means for concurrently adjusting the positions thereof relative to the axis of said disc, a rotatable member coupled to said axle for rotation in timed relation therewith, said cylindrical member having a portion thereof in screw-threaded engagement with said rotatable member, with said rotatable member being movable axially of said screw-threaded portion, and mechanism connecting said rotatable member to said axle supporting means so that axial movement of said rotatable member varies the pressure of said wheel upon said disc, whereby variations of the load tending to change the relationship between the rotational speeds of said wheel and said cylindrical member will produce a compensating variation in the frictional force between said wheel and said disc.

7. The combination specified in claim 6, further including an output differential mechanism through which power is transmitted to the load, said differential mechanism being coupled on one side thereof to said power supply means and on the other side thereof to said axle for nullifying the effective power output of the integrating device when said ball means and said wheel are set in predetermined positions.

8. In a mechanical integrator of the type having a rotatable integrating member with driving means adapted to rotate the same and adjusting means to control the speed at which said integrating member is rotated, the combination therewith of a second rotatable member frictionally coupled to said driving means, said second rotatable member being coupled also to the external load of the integrator, means controlled by said adjusting means for determining the speed at which said second rotatable member will be rotated by said driving means, and motion-responsive means controlled jointly by said integrating member and said second rotatable member in accordance with their relative speeds for regulating the amount of frictional coupling between said second rotatable member and said driving means without appreciably affecting the torque required to rotate said integrating member.

9. A precision control power integrator comprising a rotatable disc, a first and second rotatable member driven by said disc, means coupled to adjust the position of said first and second rotatable members relative to the rotational axis of said disc for selecting the speeds at which said first and second rotatable members will rotate, output means coupled to said second rotatable member for transferring power from said rotatable disc to a load through said second rotatable member, sensing means for sensing differential rotational motion between said first and second rotatable members, and means responsive to said sensing means for adjusting the amount of the coupling between said disc and said second rotatable member.

References Cited in the file of this patent

UNITED STATES PATENTS

| | | |
|---|---|---|
| Re. 22,779 | Swift | Aug. 13, 1946 |
| 2,329,216 | Peters | Sept. 14, 1943 |
| 2,572,523 | Schaefer | Oct. 23, 1951 |
| 2,576,863 | Ten Bosch | Nov. 27, 1951 |